Patented May 6, 1924.

1,493,370

UNITED STATES PATENT OFFICE.

THOMAS W. MILLER, OF ASHLAND, OHIO.

METHOD OF MAKING AND VULCANIZING DIPPED RUBBER ARTICLES.

No Drawing.   Application filed January 4, 1923.  Serial No. 610,701.

*To all whom it may concern:*

Be it known that I, THOMAS W. MILLER, a citizen of the United States, residing at Ashland, county of Ashland, State of Ohio, have invented certain new and useful Improvements in Methods of Making and Vulcanizing Dipped Rubber Articles, of which the following is a specification.

My invention relates to the method of making and vulcanizing dipped rubber articles, that is to say, articles which are preformed by dipping suitable forms in a rubber solution, and afterwards vulcanizing the same, and has for its object to provide an improved method of dipping the same, whereby the subsequent vulcanization will be accomplished in less time and at a lower temperature than heretofore, said result being obtained by the particular method of forming the dipped articles.

More specifically, my invention resides in providing two separate baths, each comprising a rubber compound, one of said baths containing rubber, sulphur and a metallic oxide, such as oxide of zinc, lead, or lime, and the other bath containing rubber and an organic accelerator, it being understood that either or both baths may contain other fillers and any desired colors.

Each of these baths is formed by dissolving rubber and the other constituents in naphtha or other solvent, which will produce a rubber cement of a consistency suitable for dipping. The form then is immersed first into one bath, and then, after a sufficient drying, in the other bath. This process may be continued to any desired extent by alternate dipping, until the desired thickness of the rubber compound on the form is obtained. Inasmuch as it has been found that the organic accelerator very readily will penetrate the layer of stock containing the sulphur and metallic oxide, it may be preferred to make the first and last dips into the bath containing the accelerator, then applying any desired number of intermediate dips from the bath containing the sulphur. After the article has been dipped to the desire thickness in the manner above described, vulcanization may be effected by exposing the article in any desired manner to a temperature of 150° F. or higher.

While I have described one bath as containing rubber, sulphur and metallic oxide, and the other bath as containing rubber and an organic accelerator, this combination may be varied, for instance, by forming one bath of rubber and sulphur, and the other bath of rubber, metallic oxide, and the accelerator, it being essential only that the organic accelerator and the sulphur be in separate baths. Or if preferred the necessary quantity of metallic oxide may be split and included in both baths.

Having thus fully described my invention, what I claim as new and desire to secure by Letters Patent, is:—

1. The method of forming and vulcanizing dipped rubber articles, which consists in applying to the forms separate layers of rubber compound, said layers containing separately an organic accelerator and sulphur, and then vulcanizing by heat the articles so formed.

2. The method of forming and vulcanizing dipped rubber articles, which consists in preparing separate rubber solutions, one containing an organic accelerator and the other containing sulphur, then applying to the forms by dipping separate layers of said solutions, and finally vulcanizing by heat the articles so formed.

3. The method of forming vulcanizing dipped rubber articles, which consists in preparing separate rubber solutions, one containing an organic accelerator and the other containing sulphur, then applying to the forms by dipping first a layer of the solution containing the accelerator, then one or more layers of the solution containing the sulphur, and then a layer of the accelerator solution, and finally vulcanizing by heat the articles so formed.

In testimony whereof I hereunto affix my signature.

THOMAS W. MILLER.